United States Patent [19]

Hyllberg

[11] Patent Number: 6,069,346
[45] Date of Patent: May 30, 2000

[54] CERAMIC HEATER ROLLER WITH GROUND SHIELD AND FAULT DETECTION

[75] Inventor: Bruce E. Hyllberg, Gurnee, Ill.

[73] Assignee: American Roller Company, Union Grove, Wis.

[21] Appl. No.: 09/050,492

[22] Filed: Mar. 30, 1998

Related U.S. Application Data

[63] Continuation-in-part of application No. 08/702,413, Aug. 14, 1996, Pat. No. 5,869,808, which is a continuation of application No. 08/541,569, Oct. 10, 1995, Pat. No. 5,616,263, which is a continuation of application No. 08/003,156, Jan. 12, 1993, abandoned.

[51] Int. Cl.⁷ .................................................. G03G 15/20
[52] U.S. Cl. ............................................................ 219/469
[58] Field of Search ........................... 219/216, 469–471, 219/509, 519; 399/67, 69, 333; 432/60, 228; 492/46; 118/60

[56] References Cited

U.S. PATENT DOCUMENTS

| | | | |
|---|---|---|---|
| 4,395,109 | 7/1983 | Nakajima et al. | 219/216 |
| 4,888,464 | 12/1989 | Shibata et al. | 219/216 |
| 5,191,381 | 3/1993 | Yuan | 399/90 |
| 5,315,356 | 5/1994 | Nagato et al. | 399/333 |
| 5,408,070 | 4/1995 | Hyllberg | 219/469 |
| 5,420,395 | 5/1995 | Hyllberg et al. | 219/470 |
| 5,609,553 | 3/1997 | Hyllberg | 492/53 |
| 5,616,263 | 4/1997 | Hyllberg | 219/469 |

FOREIGN PATENT DOCUMENTS

| | | |
|---|---|---|
| 0 240 730 A1 | 10/1987 | European Pat. Off. . |
| 61-132974 | 6/1986 | Japan . |
| 63-036284 | 2/1988 | Japan . |
| 7-219363 | 8/1995 | Japan . |
| 09127818 | 5/1997 | Japan . |
| WO 94/16539 | 7/1994 | WIPO . |
| WO 94/28691 | 12/1994 | WIPO . |

OTHER PUBLICATIONS

European Search Report dated Jun. 24, 1999 for PCT/US99/04739.

*Primary Examiner*—Joseph Pelham
*Attorney, Agent, or Firm*—Quarles & Brady LLP

[57] ABSTRACT

A thermal conductive roller (10, 80) for use in copying machines, steam-heated and induction-heated applications includes a ceramic heating layer (14, 84) formed by plasma-spraying a ceramic material to form an electrically conductive heating layer. In a first embodiment, power is supplied through connections on opposite ends of the ceramic heating layer (14). Ceramic insulating layers (12, 13) are used between the core (11) and heating layer (14), and between the heating layer (14) and the conductive layer (17). A conductive layer (17) is disposed over and around the ceramic heating layer (14) and the insulating layers (12, 13) to counteract the capacitive effects of the insulating layers (12, 13). Circuitry (38, 39) for detecting faults in the ceramic insulating layers (12, 13) is connected across lines (32, 33) supplying power to the roller, as well as to a conductive portion of the core (11) and to the conductive layer (17). In a second embodiment, current is conducted radially outward through the heating layer (84) to an outer grounded metallic layer (85). In both embodiments an outer functional layer (18, 86) of ceramic, or polymeric material can be added over the conductive layer (17), or the conductive layer (17) can form the outer layer.

21 Claims, 6 Drawing Sheets

CERAMIC HEATER ROLLER WITH GROUND SHIELD AND FAULT DETECTION

CROSS-REFERENCE TO RELATED APPLICATIONS

This is a continuation-in-part of U.S. patent application Ser. No. 08/702,413, filed Aug. 14, 1996 now U.S. Pat. No. 5,869,808, which was a continuation of U.S. patent application Ser. No. 08/541,569 Oct. 10, 1995, now U.S. Pat. No. 5,616,263, which was a continuation of application Ser. No. 08/003,156 Jan. 12, 1993, now abandoned.

BACKGROUND OF THE INVENTION

1. Field of the Invention

The invention relates to heater rollers for use in a variety of machines, as well as methods of making such rollers, and circuits for detecting faults in such rollers.

2. Description of the Background Art

In recent years, the assignee of the present invention has introduced ceramic heater rollers as an alternative to steam-heated and induction-heated rollers used in the papermaking, printing and laminating industries and the paper, film, and foil converting industry. Such rollers are characterized by at least one insulating layer and by a heating layer of ceramic material that is heated by electrical current flowing through the layer. This type of roller operates as a resistance heating device, but this type of roller also acts as a capacitor, as a result of the insulating layer being positioned between two electrodes to form the capacitor.

A few milliamps of current may be available on the heater roller surface. It is desirable to have the voltage and current on the surface of the roller as close to zero as possible.

A second technical problem arises from cracks in the ceramic material which can be due to a variety of causes including: 1) operation at temperatures which are excessive, or at temperatures which vary greatly along the roller, or 2) sharp impacts caused by dropped objects or foreign objects in the processing line. Sometimes, these cracks are too small to be readily observed. Such cracks may further result in electrical faults occurring between components of the roller that would otherwise be insulated by the ceramic layers. Therefore, it would be desirable to have some method to monitor electrical faults in the roller which are caused by cracks in the ceramic.

The present invention is directed to improved constructions of ceramic heater rollers, as well as associated control equipment, and to improved methods of making such heater rollers.

SUMMARY OF THE INVENTION

The invention uses a conductive layer over a ceramic heating layer and an insulating layer in a ceramic heater roller. The conductive layer in turn may have an outer functional layer of metal, ceramic, rubber, or other materials, or the conductive layer may be the outer layer. The conductive layer is made of a single material or a blend of materials that is sufficiently electrically conductive to effectively block, or to otherwise neutralize the effects of, the electrostatic field produced by the insulating layer, thus reducing the voltage on the outer surface of the roller to close to zero. Metals, alloys, ceramics, and cermets have been found useful for the conductive layer, although other materials such as conductive thermoplastics or rubber could be used.

Where the outer functional layer is an insulator, it has been found that the conductive layer is fairly effective in reducing the roller surface voltage close to zero even if it is not connected to ground (floating). In this case, the conductive layer is positioned between the insulating layers, and does not extend beyond the ends of the insulating layers.

The conductive layer reduces the roller surface charge by limiting the extent of the electrostatic field produced by the insulating layers. The conductive layer significantly reduces the available voltage and current on the outer surface of the ceramic heater roller, even when the conductive layer is ungrounded. These levels are close to zero when the conductive layer is grounded, for example, by connection to a ground terminal in a line-to-neutral (grounded) system, such as a 120-volt system.

Where a line-to-line secondary voltage such as 240 volts or 480 volts (with a grounded or ungrounded neutral) is applied to the ceramic heating layer, the conductive layer significantly reduces the available voltage and current on the outer surface of the ceramic heater roller by equalizing the voltage on the conductive layer.

In a second aspect of the invention, the conductive layer is connected to a ground fault sensing circuit which is employed as a fault detector. The conductive layer and the core are electrically connected to a neutral, which may be grounded, and fault detection circuitry is connected across the lines supplying power to the ceramic heating layer. In the event of a fault, or crack in the ceramic insulating material, a fault current will be sensed, power to the roller will be interrupted, and an alarm signal will be generated.

With the invention, faults can be detected early in the fault cycle, before the fault in the ceramic insulating layers is visually detectable, or detectable using other types of pickup devices. This method and apparatus also avoids the need for alternative mechanical and electrical devices for detecting faults in the ceramic layers of the roller.

Faults at any point in the circuitry of the ceramic heater roller, wiring, electrodes, insulators, or rotary connector can be detected and the power interrupted to prevent damage to equipment and harm to personnel.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENTS

Figure 1:
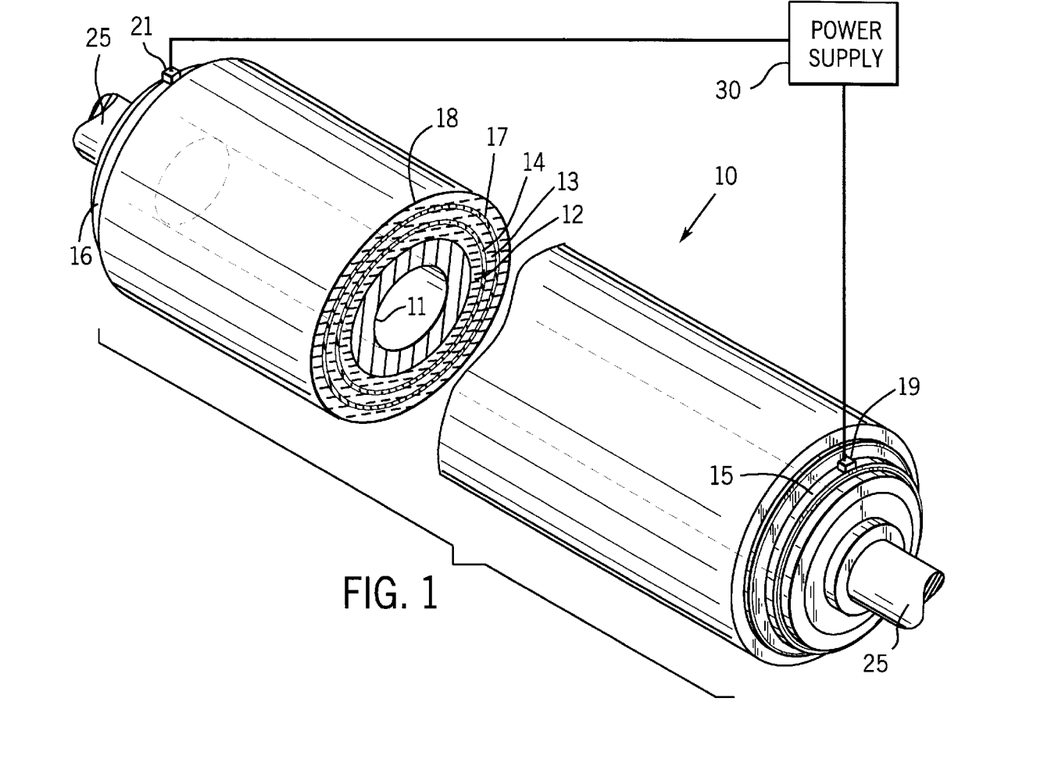
FIG. 1 is a perspective view of a roller and power supply of the present invention.

FIG. 1 shows a preferred embodiment of a heater roller 10 of a type for use in copying or printing machines, or in industrial applications, such as steam-heated, oil-heated or induction-heated rollers for the papermaking, printing and laminating industries and the paper, film, and foil converting industry.

The core 11 in the preferred embodiment is made of a conductive metal, such as steel, with aluminum and other conductive materials as alternatives. When a non-insulating core is used, the shafts 25 or their bearings must be insulated from the rest of the machine.

A ceramic heating layer 14 of titania, or a cermet which includes titania, is formed in a thickness necessary to obtain a desired electrical resistance. The ends of the layer 14 are exposed and the metal bands 15, 16 (FIGS. 1, 3) are formed by spraying a conductive metallic material on the exposed ends.

Where the ceramic heating layer 14 is titanium dioxide, a specific suitable material is Metco 102 ceramic powder. This is commercially available from Metco Corp., Westbury, N.Y., USA. Titanium dioxide ($TiO_2$) is normally an electrical insulating material. However, when the material is plasma-sprayed, some of the dioxide form is chemically reduced to a conductive sub-oxide (mono-oxide) form, rendering the deposited coating electrically semiconductive.

Titanium dioxide can be used as the only component of the heating layer 14 or it can be blended with other ceramics or metals to increase or decrease the volume resistivity of the final coating. For example, insulating ceramics such as zirconia or alumina can be blended with semiconductive ceramics such as chromium oxide, or with conductive metals such as nickel, stainless steel or other alloys, or aluminum to form cermets.

The preferred primary gas for plasma spraying is nitrogen or argon while the preferred secondary gas is hydrogen or helium. The secondary gas raises the ionization potential of the mixture, thus increasing the power level at a given electrode current. For a typical Metco plasma gun, the hydrogen level is adjusted to maintain the electrode voltage in the gun between 74 and 80 volts.

Plasma-sprayed ceramic coatings can be applied in one pass (layer) of the plasma gun or in multiple passes. The normal method for most types of coating applications is to apply multiple thin coatings of ceramic and build up to the required thickness. Although the ceramic layer described above has a uniform ceramic composition, the sublayers of ceramic in the resulting layer 14 do not have to have the same composition.

The thickness of the heating layer 14 can be adjusted to provide the appropriate resistance for the application. The heating layer 14 may vary in total thickness from about 1 mil to about 100 mils depending on the roller diameter and length, operating temperature, wattage throughput and power supply voltage. In the preferred embodiment, the heating layer 14 is in a range from one mil to ten mils thick.

Plasma-sprayed ceramic can be applied in very thin layers (at least as low as 0.1 mil per spray pass). For many heating applications, the heating layer formed by plasma-spraying thin layers will provide a minimal temperature variation due to thickness variation of the resulting layer.

The sprayed metal bands 15, 16 are 1 to 2 mils thick, and about ¼ inch wide, of Metco 480 bond coat (95/15 nickel/aluminum) sprayed on top of the exposed ends of the heating layer.

A lower insulating layer 12 (FIGS. 2, 3) is also made of an insulating ceramic, such as alumina or zirconia, and is thick enough to resist dielectric breakdown at the maximum applied voltage. It is also thick enough to minimize resistive and capacitive leakage at the maximum roller temperature, within practical limits. The lower insulating layer 12 is normally alumina and is from twenty to forty mils thick.

Figure 2:
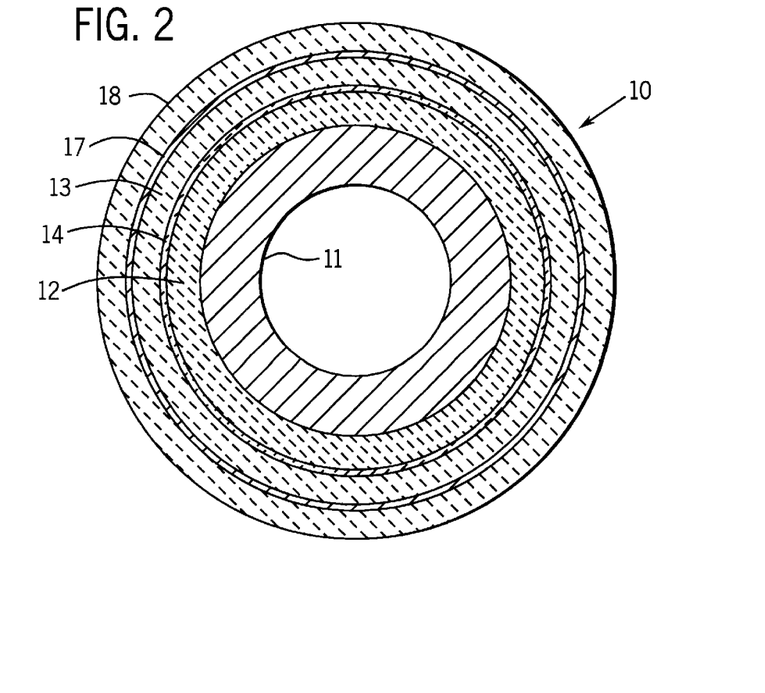
FIG. 2 is a transverse sectional view of a portion of the roller of FIG. 1.
Figure 3:
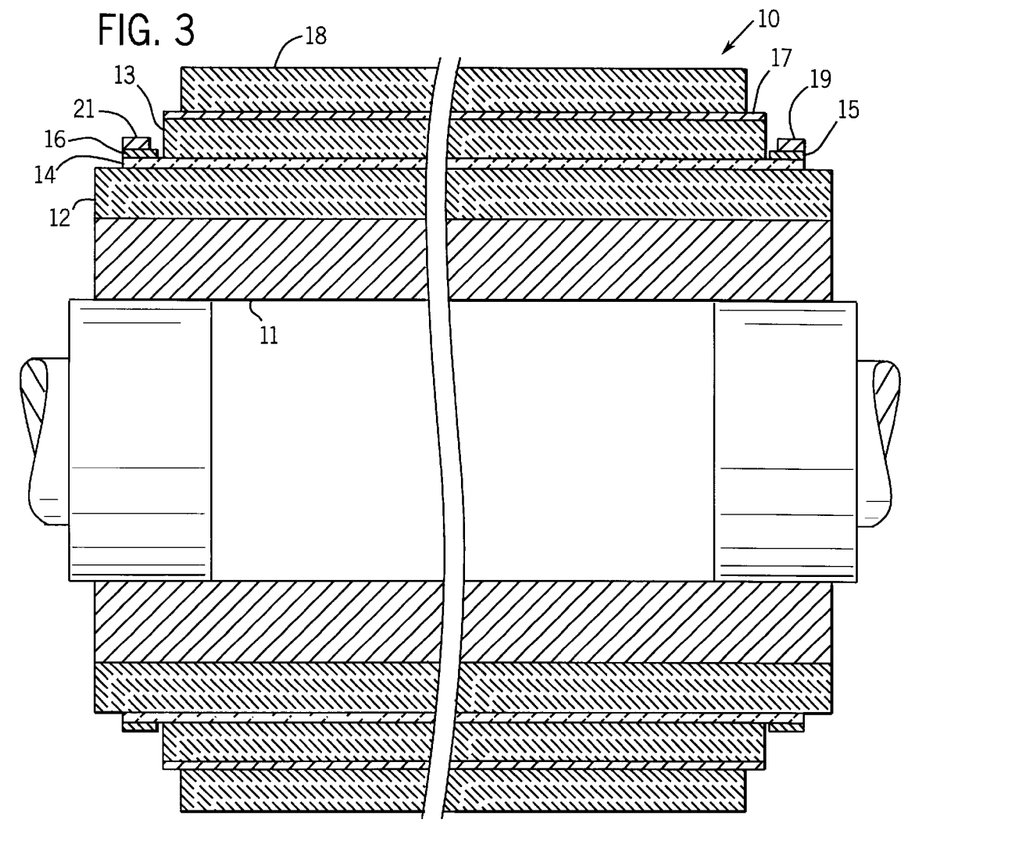
FIG. 3 is a longitudinal sectional view of the roller of FIG. 1.

The upper insulating layer 13 is a material such as alumina or zirconia with the same requirements and properties as the lower insulating layer 12. It is normally a ten to twenty mil thick layer of alumina.

Where the layers 12, 13, 14 are ceramic, a sealant is applied. This increases the dielectric strength of the layers 12, 13, 14 and prevents moisture and humidity from changing the effective ceramic resistance and causing short circuits. While the layers 12, 13, 14 are still hot from the plasma or thermal spraying, a dielectric organic sealant material such as Carnauba wax or Loctite 290 weld sealant is applied. The sealant (not shown) is cured, if necessary (Loctite 290), with heat, ultraviolet light, or spray-on accelerators. The ceramic porosity level is generally less than 5% by weight (usually on the order of 2%). Once sealed, the porosity level has a minimal effect on the coating properties for this application.

The preferred types of materials are 100% solids with low viscosity. These include various kinds of waxes, condensation cure silicone elastomers, and epoxies, methacrylates, thermoset resins and polymerizing weld sealants, such as Loctite 290.

The sealant will generally be a high resistance material, although the electrical properties of the sealant affect the overall properties of the sealed ceramic layers 12, 13, 14. For example, sealing with Carnauba wax will result in a higher resistance of the sealed ceramic layers 12, 13, 14 than Loctite 290 weld sealant because it is a better dielectric material.

A conductive shield layer 17 is positioned to cover the heating layer 14, as well as the upper insulating layer 13. The shield layer 17 is a thin layer of a metal, conductive ceramic, or cermet having a resistivity in a range from $10^3$ ohm-cm to $10^{-6}$ ohm-cm. Like the heating layer 14, a small portion on one or both ends (FIG. 3) is exposed to allow electrical connections to the shield layer 17, when it is to be grounded. If the shield layer 17 is ungrounded, the ends of the layer 17 are not exposed. The shield layer 17 is normally a 0.5 mils thick layer of titania or titania/Metco 480 cermet. The shield layer 17 can be connected to the roller end caps (not shown) at one or both roller ends using a bead of conductive elastomer in a space between the shield layer ends and the roller end caps.

An outer functional layer 18 can be applied over the shield layer 17. This is the layer that will contact a work object, and transfer heat between the roller 10 and the work object. This outer functional layer 18 can be a conductive material if the shield layer 17 is grounded, and must be an insulator if the shield layer 17 is ungrounded. The outer functional layer 18, can be any material that can be bonded to the shield layer 17. These materials include ceramics, metals, and other thermally sprayed materials, elastomers, thermoplastics, and other coatings. The outer functional layer is normally a layer of alumina, ten to fifteen mils in thickness.

Figure 4:
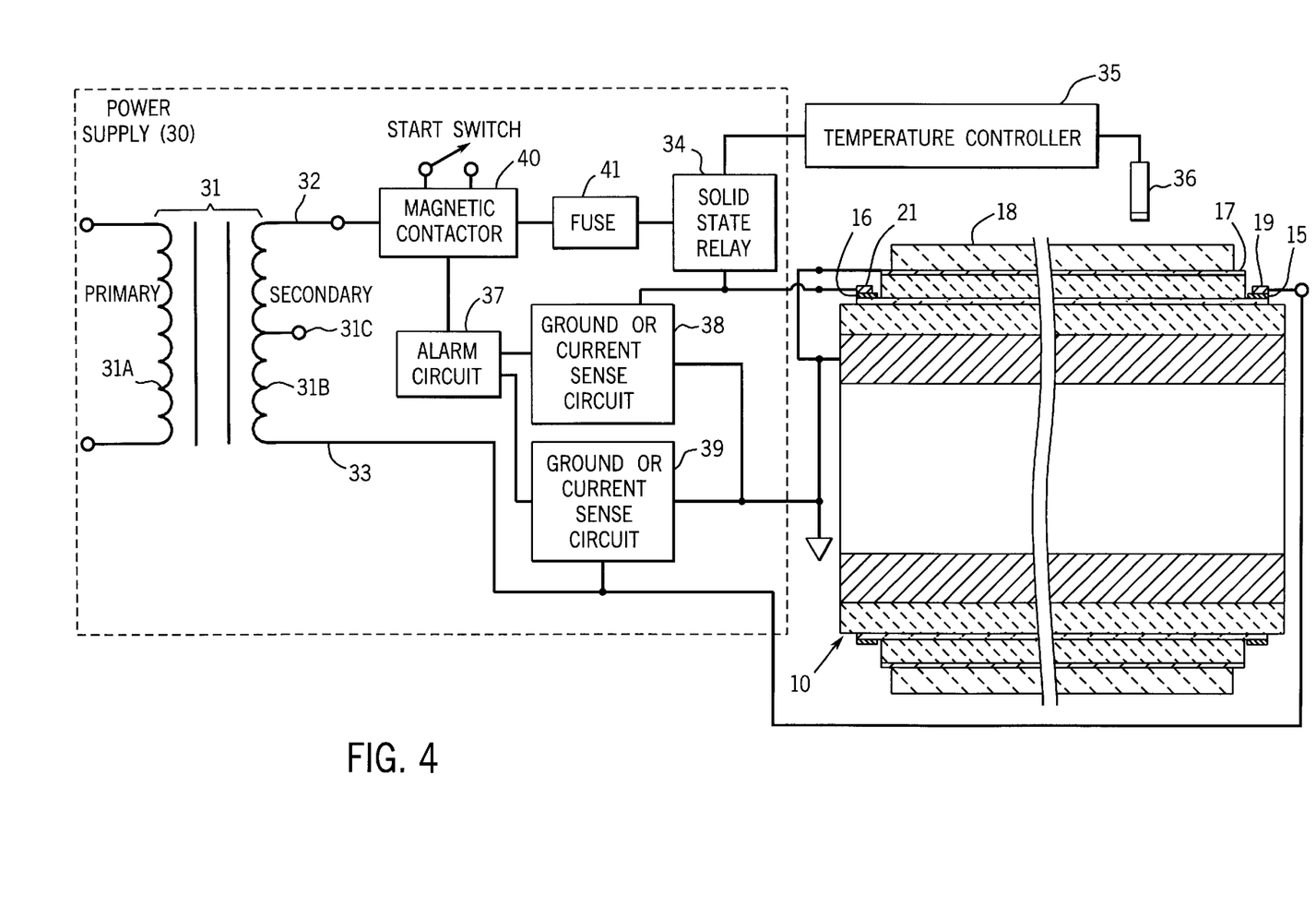
FIG. 4 is an electrical schematic diagram of the power supply of FIG. 1 connected to the roller of FIG. 1.

The basic power supply system 30 for a ceramic heater roller 10 is shown in FIG. 4. An isolation transformer 31 has a primary winding 31A and a secondary winding 31B with a center tap 31C for connection to neutral or ground. The secondary winding 31B supplies power to the ceramic heater roller 10 through supply lines 32 and 33. Power is switched on and off through magnetic contactor and start switch 40, and a fuse 41 is provided in supply line 32. Line voltage from the secondary winding 31B is further switched on and off by a solid state relay 34, which in turn is controlled by a closed loop temperature controller 35 connected to an infrared sensor 36 near the roller surface. This limits heating of the roller 10 to some preset threshold.

If the transformer secondary 31B is floating (not connected to ground in FIG. 4), each end applies a line-to-neutral voltage of 240 volts to a respective one of the brushes 19, 21 at opposite ends of the roller 10. The two sides of the secondary 31B are out of phase due to the inductance of the transformer 31. A null point of zero volts is observed at the center of the roller 10.

Figure 5A:
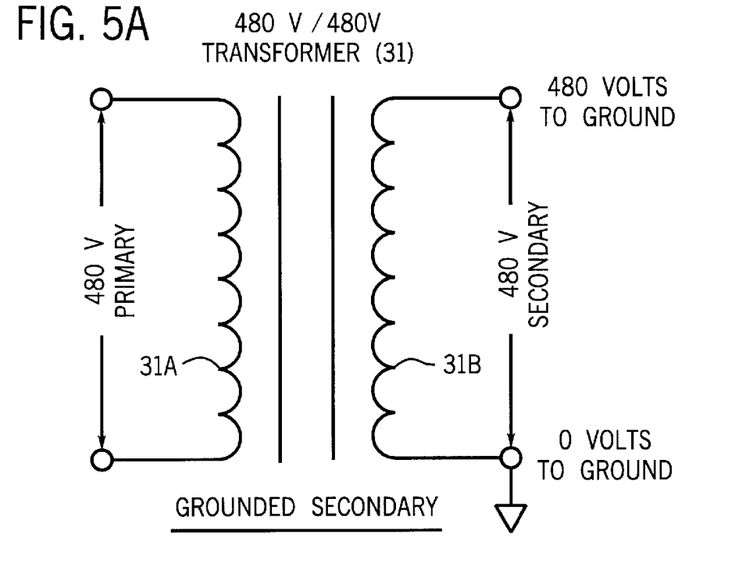
FIGS. 5A and 5B are electrical schematics of two types of electrical circuits in the power supply of FIG. 4.
Figure 5B:
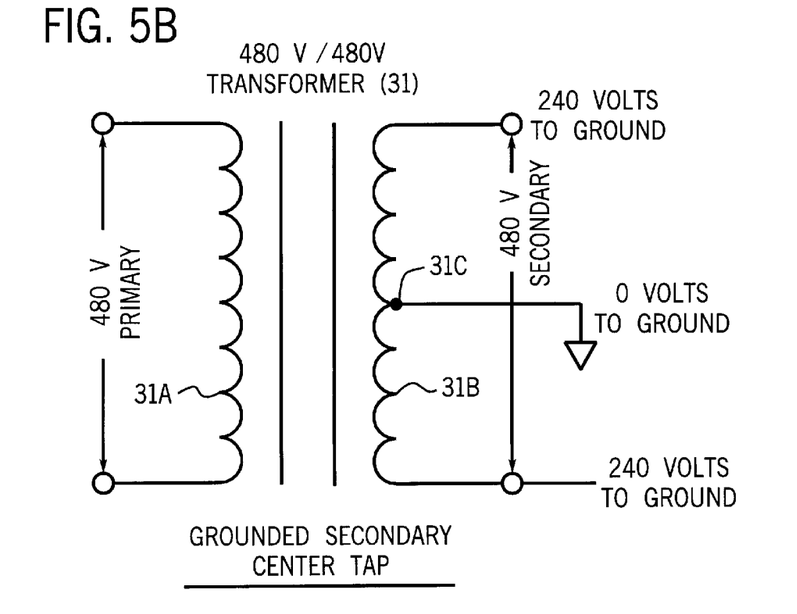

FIGS. 5A and 5B show the possible alternative configurations for the transformer 31 in the power supply 30. If one side of the secondary is grounded as shown in FIG. 5A, the voltage at one end of the roller 10 would be 480 volts and at the other end would be zero volts. With this style of electrical hook-up, the shield layer 17 is connected to the ground terminal. If the transformer 31 has a direct ground connection on the center tap of the secondary 31B (FIG. 5B) or is grounded through resistance or capacitance for balancing (not shown), the situation is the same as for the ungrounded secondary in FIG. 4. Thus, either a floating secondary or center tapped balanced grounded secondary will minimize the voltage on the heating layer (to ground) and also on the surface of the ceramic heater roller 10.

The voltage on the roller surface is from zero volts to the maximum applied voltage, depending on the electrical supply hook-up. In an actual test on a roller without a shield layer, with 453 volts applied from an isolation transformer having a floating, ungrounded, secondary winding, but with the core 11 of the roller 10 grounded, voltages were detected on the outer surface of the roller, with the voltage being lower at the midpoint than at the ends.

If the shield layer 17 is connected to ground, the voltage on the shield layer 17 is close to zero. The voltage and current available at the surface of the roller (layer 18) are also close to zero.

The shield layer 17 can be connected at exposed ends to an end cap of the type disclosed in a copending application of Hyllberg et al., filed Mar. 3, 1998, and entitled "End Cap Contact Assembly for a Heater Roller". The end cap is grounded, normally by bolting it to the core 11 which is grounded. The electrical connector can be a small bead of an electrically conductive elastomer between the end cap and the exposed part of the shield layer. The bead makes full contact around the circumference of the roller on both ends and also works as a cleaning solvent barrier or seal. An extremely low resistance level in the bead material is not required since the shield layer 17 will only transport a few milliamps of current even when a fault is occurring.

FIG. 4 shows the inclusion of fault sensing circuits 38, 39 in the power supply unit 30 for a ceramic heater roller 10. The location of the ground or current sensing circuits 38, 39 is only one example. In other embodiments, the interrupt circuitry 38, 39 could be installed between the transformer 31 and solid state relay 34 rather than where it is shown in FIG. 4. One circuit with sufficient fault sensing circuitry could be used to sense faults for a plurality of rollers. If a ground fault sensing circuit is electrically connected to the ceramic heater layer 14, contact with the roller surface signals an alarm condition through an alarm circuit 37 and causes the circuitry 38, 39 to shut off power to the roller 10 if a preset current limit is exceeded.

The fault sensing circuitry 38, 39 is commercially available as UL943 Class A ground fault circuit interruption (GFCI) modules, which are preset to shut off the power circuit if leakage to ground exceeds established certain electrical standards. A household bathroom GFCI, for example, activates at about 5 milliamps leakage. Industrial electronic modules are also available for sensing ground fault conditions in AC, single and multiphase, and DC circuits. One source for these circuits is Bender Inc., Exton, Pa. These circuits can continuously monitor either capacitive or resistive current leakage to ground. Power can be interrupted if leakage to ground increases above a preset limit. An alarm condition is signaled if a preset level is reached. A warning may be activated if the leakage is increasing but not yet at the alarm level.

The primary fault mode is cracking of the ceramic layers 12, 13, 14 in the roller. Cracks can be initiated from a number of sources. The two most common would be 1) high stress levels in the ceramic caused by an over temperature condition in the roller or extreme nonuniformity in temperature profile and 2) unintentional damage to the roller surface resulting from dropped tools or foreign objects passing through nipped rollers.

Once the crack has been initiated in the heating layer 14, the resistance in the immediate area of the crack increases far beyond the intended level. These cracks are generally very hard to see without a magnifier early in the fault cycle. Because the heating layer 14 is one large resistor, it becomes a resistor divider with an increased resistance (and increased watt density) around the crack. The temperature in or near the crack may reach several hundred degrees in a very tiny area. The crack generally propagates around the roller 10 in a ring eventually choking off all current flow through the heating layer 14. The insulation around the cracked area is compromised by a combination of crack propagation and high temperature. The resistance of the ceramic is reduced at high temperatures and the solid organic sealant is degraded. Arcing or complete dielectric failure of an insulator is not likely, although current leakage in the area of the fault is very likely.

A fault is defined as a crack in any of the ceramic layers 12, 13 or 14, a failure of the heating layer 14 to conduct or a dielectric breakdown in one or both of the insulating layers. Detection of a fault depends on monitoring the possible manifestations. A fault produces a reduction in the total current through the roller (i.e. roller resistance) at a given temperature, but not immediately. A fault may cause a small amount of current to flow through one of the insulators to ground. The available voltage and current at a point on the surface of the roller may change. The area around the fault may become very hot and there may be visible light produced if the fault is allowed to proceed.

Figure 6:
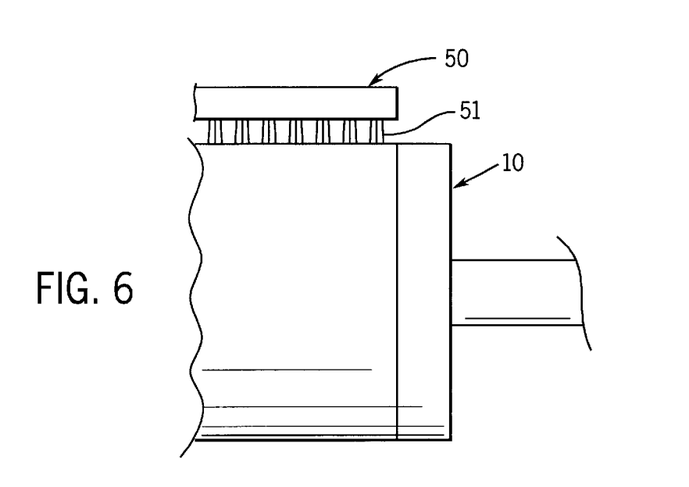
FIGS. 6, 7, 8 and 9 are transverse sectional views showing four types of electrical pickups for use with the circuitry of FIG. 4.

Various types of pickup devices have been proposed to detect such faults. FIG. 6 illustrates a conductive carbon fiber brush 50 which constantly monitors the roller surface for changes in available voltage and current. The fibers 51 may wear on the surface of the roller and the bristles would require cleaning.

Figure 7:
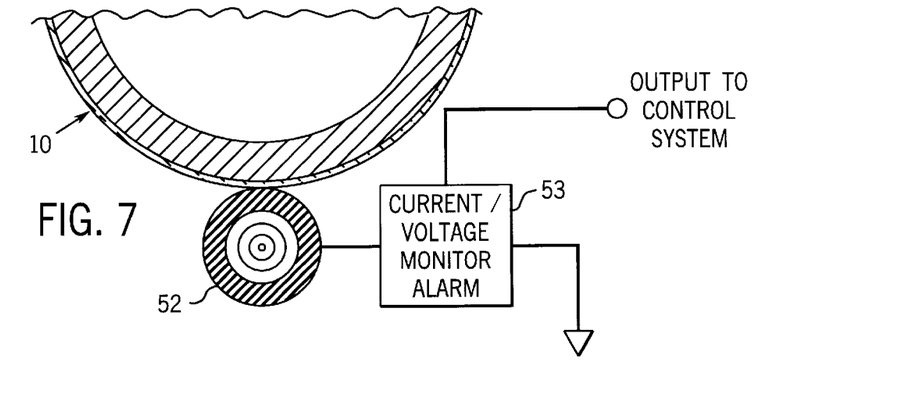

FIG. 7 illustrates an improvement over the brush design in that the form of a rubber pickup roller 52 which connects to a current/voltage monitor alarm 53 and which will not experience as much wear on itself or on the heated roller surface as the fiber brush 50. Accumulation of debris on the surface of rubber roller 52 is not likely and the roller 52 is cleaner than the brush-type discussed above. However, the rubber roller 52 and mounting hardware are an additional expense and inconvenience for the user and there may not be space available in an existing machine.

Figure 8:
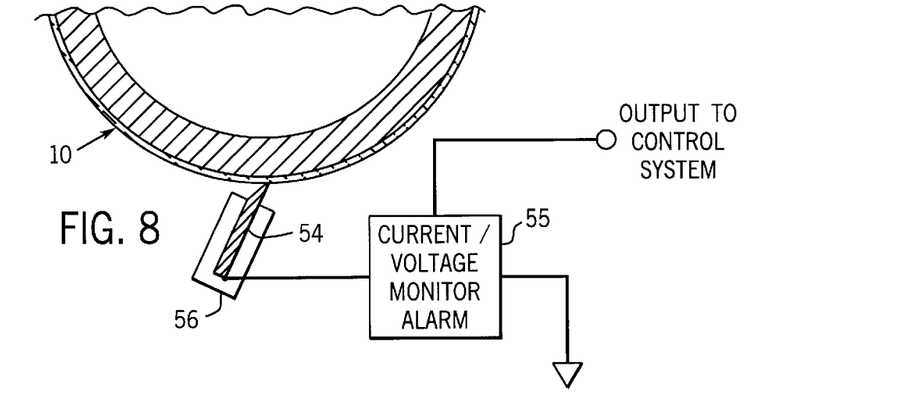

FIG. 8 illustrates use of a doctor blade 54 connected to a voltage and current sensor and alarm 55. A housing 56 for the doctor blade 54 is electrically insulated, which is not a standard design. This system has advantages in keeping the heated roller clean and free of material buildup. Like the brush 50 and roller 52, this type of sensor cannot detect a fault until it reaches the heated roller surface.

Figure 9:
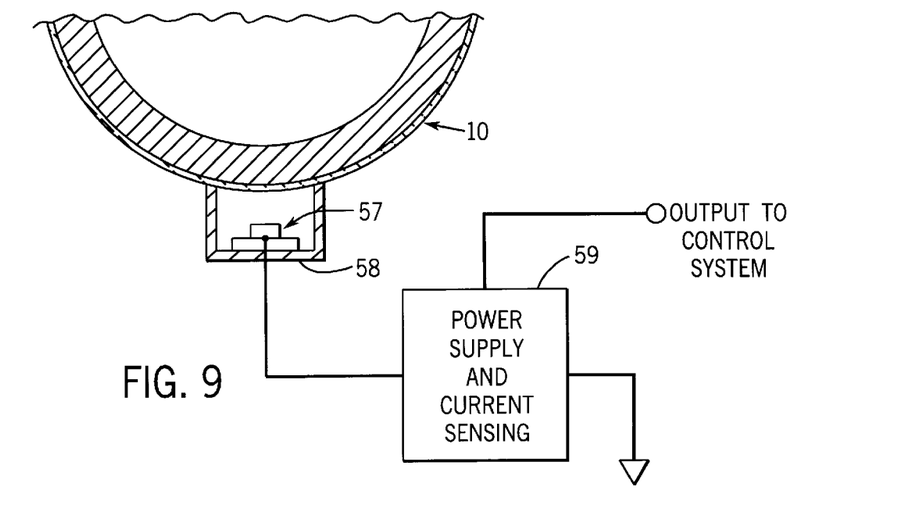

FIG. 9 illustrates the use of an array of one or more types of non-contact sensors 57 (optical, thermal or field-responsive sensors) supported in housings 58 to constantly monitor the entire surface of the roller. Faults produce a signal from device 57 to the power supply and current sensing circuit 59 which interrupts power to the roller 10. This type of system tends to be expensive because a number of sensors are required, along with some supporting circuitry. The devices shown in FIGS. 6–9 are all designed to operate when the roller is rotating.

If ground fault sensing circuitry 38, 39 is used on the ceramic heater roller 10, as illustrated in FIG. 4, any breakdown of the insulating layers 12, 13 around the heating layer 14 would cause a small current to flow to ground that could be sensed to signal the shut off of power to the roller 10. In FIG. 4, the ground fault circuitry 38, 39 is connected across the supply lines 32, 33 to brushes 19, 21. The connection of the ground fault interrupt circuitry 38, 39 to the supply lines 32, 33 can be direct or through current transformers, so long as an electrical signal can be transmitted through the connection. Ground terminals in the circuitry 38, 39, as well as the roller core 11 and the shield layer 17 are connected to ground as shown. This type of fault detection is superior to the other types because 1) it adds minimal cost to the heater roller assembly 10 and power supply 30; 2) it monitors the entire active roller surface whenever the heater is powered; 3) it is not subject to fowling or wear and does not need cleaning; 4) it does not require any additional space in the roller installation for supporting hardware; 5) its use is basically transparent to the user; and 6) it is more sensitive and responds earlier in the fault cycle than the other types received above.

Figure 10:
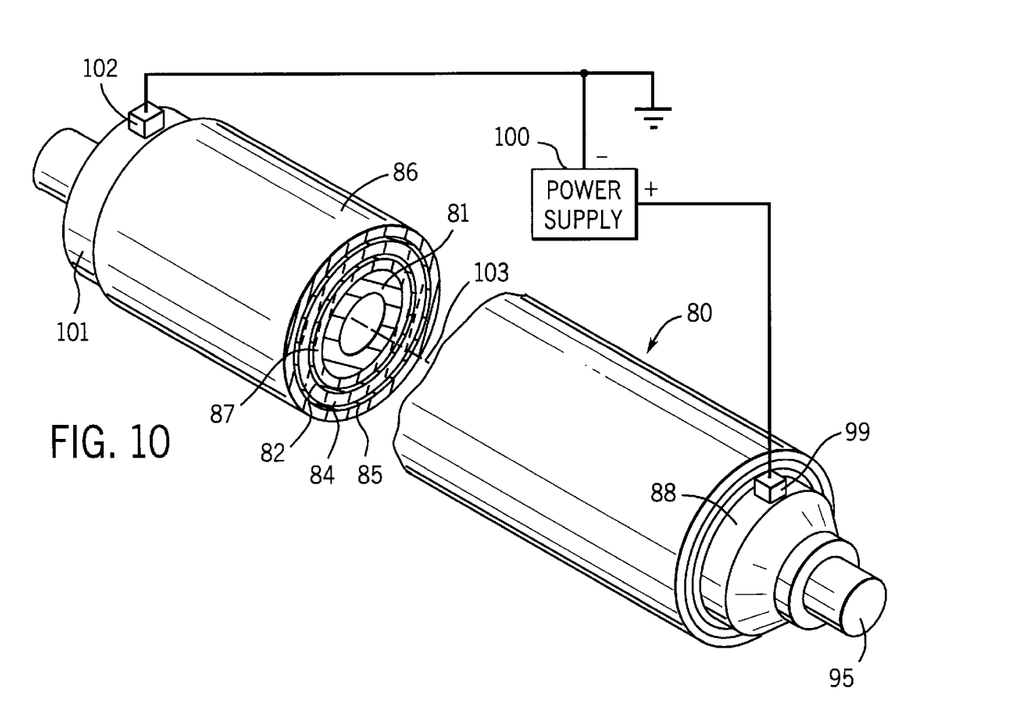
FIG. 10 is a perspective view of a second embodiment of a roller and power supply of the present invention.
Figure 11:
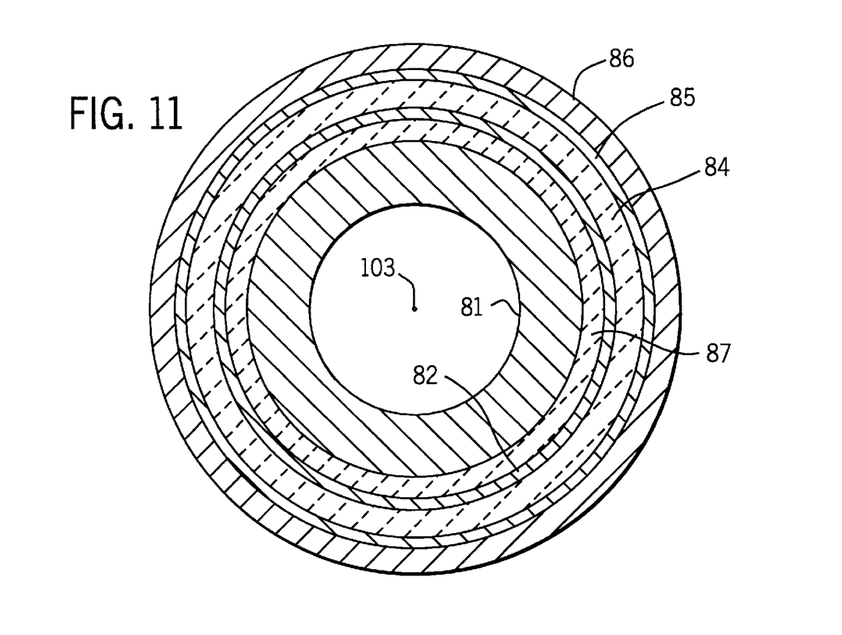
FIG. 11 is a transverse sectional view of the embodiment of FIG. 10.

FIGS. 10–11 shows an alternative, simplified embodiment of a roller 80 with a shield layer, but no ground fault sensing. This embodiment was disclosed in U.S. patent application Ser. No. 08/541,569, now U.S. Pat. No. 5,616,263, which is a grandparent of the present application. This roller 80 includes a hollow cylindrical core 81 with suitable journal shafts 95. The core 81 in this embodiment is made of a conducting material such as metal. The core 81 is electrically and (optionally) thermally insulated from a heating layer 84 by an insulating layer 87 of plasma-sprayed ceramic such as alumina, Metco 101 or Metco 105, or zirconia, Metco 201 or Metco 204, commercially available from Metco Corp., Westbury, N.Y., USA. A thin conductive layer of metal 82 of one to three mils thickness (1 mil=0.001 inches) is formed over the full outer surface of the insulating layer 87. This conductive layer 82 can be formed by plasma spraying a bond coating over the full outer surface of the insulating layer 87, or this layer 82 can be formed by an expandable metal sleeve, which is placed over the non-conducting material 87. A bond coating may then be sprayed on the metal sleeve to assist the formation of a bond to the next layer.

Next, a ceramic layer 84 from one to one hundred mils in thickness is formed over the full outer surface of the bonding layer 82.

This is followed by a second thin conductive layer of metal 85 of one to three mils thickness which is formed over the full outer surface of the layer 84. This layer 85 can be formed by an expandable metal sleeve or by nickel aluminide, such as Metco 450 or 480, or nickel chrome, such as Metco 43C, which is applied by thermal spraying to a thickness of at least one mil to three mils thick.

The outer surface of the roller 80 is provided by a functional layer 86 of a metal, such as stainless steel, nickel, or tungsten carbide/cobalt composite. The outer layer 86 can be plasma-sprayed metal, if the ceramic layer 84 is not sealed or ground, with the outer functional layer 84 plasma-sprayed and bonded to the sprayed metal layer 85. Such a outer metallic layer 86 would preferably be a nickel alloy, stainless steel, or low resistance cermet. This outer layer 86 is connected to a grounded negative (−) side of the power supply 100 through conductive layer 85 as follows.

The inner conductive layer 82 forms a first ring-shaped band 88 extending from one end of the roller 80 (FIG. 10). A brush, represented by element 99, contacts band 88 and is electrically connected to the positive (+) voltage terminal of power supply 100. The outer metal layer 85 forms a second ring-shaped band 101 extending from an opposite end of the roller 80 (FIG. 10). A brush, represented by element 102, contacts band 101 and is electrically connected to the grounded negative (−) terminal of the power supply 100. This provides a ground layer 85 just underneath the outer functional layer 86. The voltage source 100 may supply either alternating current or direct current.

With this arrangement, current flows in a radial direction between conductive layers 82 and 85 relative to a longitudinal axis 103 of the roller 80 seen in FIGS. 10 and 11.

When the outer functional layer 86 is not conductive, the material can be any elastomer, including silicone rubber, any material that can be applied by thermal spraying, including electrically insulating ceramics, or any thermoplastic or thermoset resin suitable for the roller application.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

I claim:

1. A thermal conduction roller for use in a machine, comprising:

an insulated roller core;

a heating layer of ceramic or cermet that is disposed around and over the insulated roller core for carrying an electrical current that results in heating of the heating layer;

at least one ceramic insulating layer disposed around and over the heating layer;

a conductive layer disposed around and over the heating layer and the ceramic insulating layer to counteract capacitive effects of the ceramic insulating layer.

2. A thermal conduction roller for use in a machine, comprising:

a roller core;

a heating layer of ceramic or cermet that is disposed around and over the roller core for carrying an electrical current that results in heating of the heating layer;

at least one ceramic insulating layer disposed around and over the core and underneath the heating layer;

a conductive outermost layer disposed around and over the heating layer to shield the environment around the roller from electrical voltages produced during operation of the roller; and wherein the conductive outermost layer is connectable to an electrical ground.

3. The roller of claim 1, wherein the conductive layer is left electrically unconnected.

4. The roller of claim 1, further comprising an outer functional layer disposed over and around the conductive layer.

5. The roller of claim 4, wherein the outer functional layer is made of a plasma-sprayed ceramic material.

6. The roller of claim 1, wherein the conductive layer is connectable to an electrical ground.

7. The roller of claim 1, 2 or 3, wherein the conductive layer is provided by an expandable metallic sleeve which is disposed around and over the heating layer.

8. The roller of claim 1, 2, or 3, wherein the conductive layer is made of a material selected from a group consisting of nickel alloy, stainless steel and cermet.

9. The roller of claim 1, 2 or 3, wherein the conductive layer is applied by placing an expandable metallic sleeve around and over the ceramic insulating layer and the heating layer.

10. The thermal conduction roller of claim 1, wherein the insulated roller core is insulated by a second ceramic insulating layer disposed between the heating layer and the core.

11. The thermal conduction roller of claim 10, further comprising fault detection circuitry electrically connected across lines which supply power to the heating layer, and further connected to the conductive layer and to the conductive portion of the roller core to detect faults in either one of the first ceramic insulating layer and the second ceramic insulating layer.

12. The thermal conduction roller and fault detection circuitry of claim 11, wherein the fault detection circuitry responds to detection of a fault to interrupt the supply of power to the heating layer.

13. The thermal conduction roller of claims 11 or 12, in which the fault detection circuitry responds to detection of a fault to generate an alarm signal.

14. A method for detecting faults in a thermal conduction roller formed in a plurality of layers supported by a roller core having at least a conductive portion, the method comprising:

supplying power through a pair of supply lines to a heating layer in the roller;

partially enclosing the heating layer with a conductive layer that is disposed over and around the heating layer;

connecting ground fault interrupt circuitry across the supply lines; and connecting the conductive layer and the conductive portion of the core through a neutral connection to the fault interrupt circuitry.

15. The method of claim 14, further comprising the step of detecting a fault current from the roller and interrupting power to the heating layer.

16. The method of claim 15, wherein power is supplied from a power supply including a secondary winding of a transformer that has a neutral, ungrounded center tap.

17. The method of claim 16, wherein the shield layer and the conductive portion of the core are further connected through the neutral connection to an electrical ground.

18. The method of claim 17, wherein power is supplied from a power supply including a secondary winding of a transformer that has a grounded center tap.

19. The method of claim 15, 16, 17 or 18, wherein in response to detecting a fault, an alarm signal is generated.

20. The method of claim 14, wherein the plurality of layers includes a first insulating layer positioned between the core and the heating layer and a second insulating layer positioned between the heating layer and the conductive shield layer.

21. The method of claim 20, wherein the first insulating layer is formed of a ceramic material and wherein the second insulating layer is formed of a ceramic material.

* * * * *

UNITED STATES PATENT AND TRADEMARK OFFICE
CERTIFICATE OF CORRECTION

Patent No.    : 6,069,346
Dated         : May 30, 2000
Inventor(s)   : Bruce E. Hyllberg It is certified that error appears in the above-identified patent and that said Letters Patent is hereby corrected as shown below:

Col. 8, line 57, -- and -- should be inserted after "heating layer;"

Signed and Sealed this

Twenty-second Day of May, 2001

Attest:

Attesting Officer

NICHOLAS P. GODICI

Acting Director of the United States Patent and Trademark Office